Patented Apr. 9, 1935

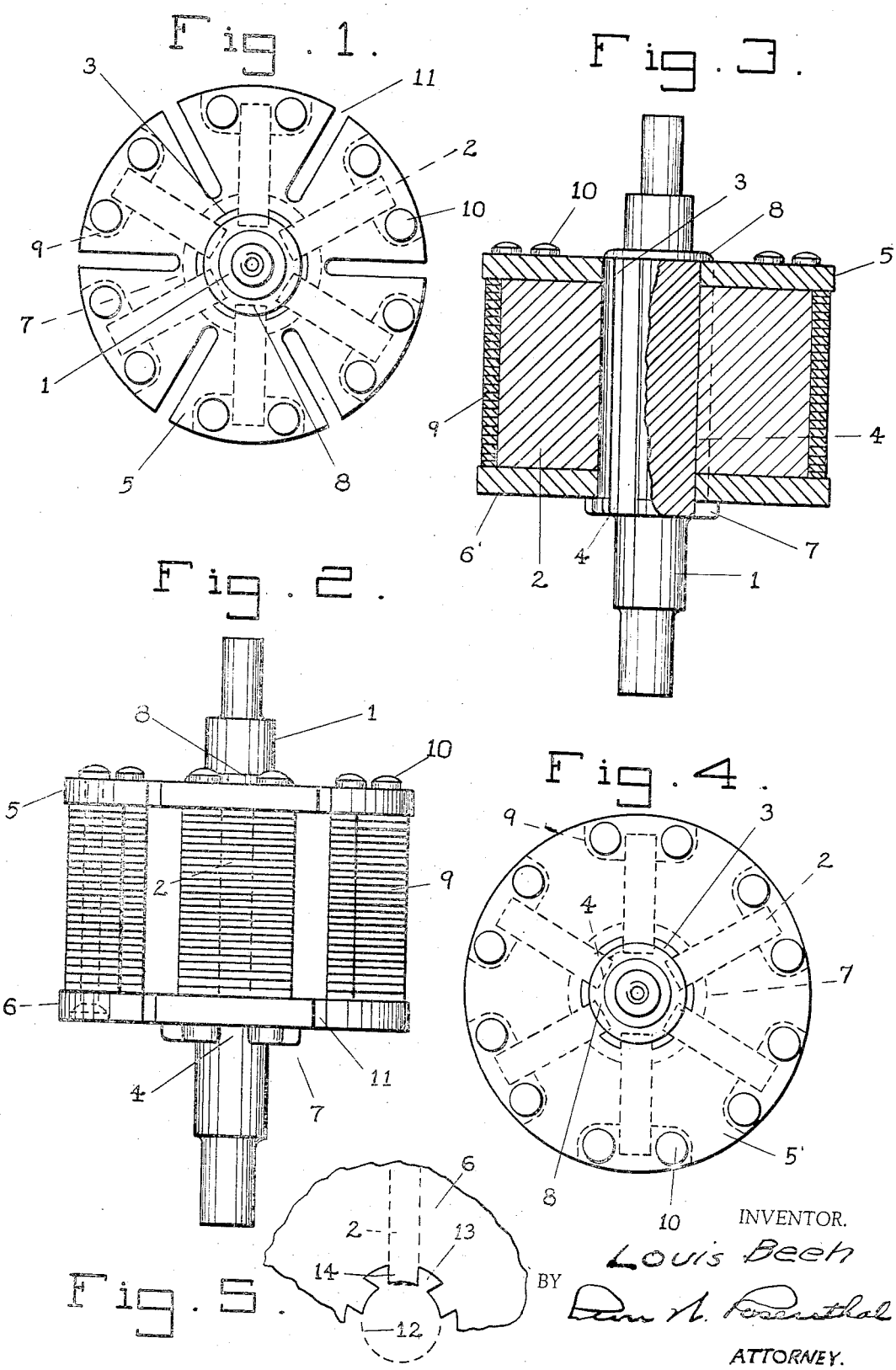

1,996,946

UNITED STATES PATENT OFFICE 1,996,946

MAGNETIC ROTOR

Louis Beeh, Longmeadow, Mass., assignor to United American Bosch Corporation, Springfield, Mass., a corporation of New York Application December 14, 1933, Serial No. 702,331

13 Claims. (Cl. 171—252)

This invention relates to improvements in magnetic rotors, particularly rotors intended chiefly for use in suitable stators of magnetos adapted to supply ignition current to internal combustion engines but also intended for use in dynamo electric machines in general.

An object of this invention is to provide a rotor comprising a shaft with magnets thereon and suitable securing means for enabling the magnets to be firmly retained in operative position with respect to the shaft, the entire construction being designed to be easily assembled upon the shaft and tightly affixed thereon.

A further object of the invention is to provide a magnetic rotor in which the magnets are radially arranged with one pole of each disposed adjacent the shaft and the other pole preferably carrying a laminated pole piece, the magnets being relatively short between poles but of metal of such high coercive force and remanence that a magnetic field of the necessary strength is provided.

Still another object of the invention is to provide a rotor comprising a shaft having longitudinal grooves in its surface into which are fitted radially arranged magnets and end discs, together with suitable means for preventing displacement of the magnets and discs radially and axially of the shaft, whereby a tight and rigid rotary structure results.

These and other objects and advantages of the invention will be made clear in the ensuing description which sets forth two distinct embodiments. I of course do not wish to be limited to the specific forms illustrated herein, but I reserve the right to make changes which do not depart from the spirit of the invention or exceed the scope or meaning of the broad terms in which the appended claims are expressed.

On the drawing:

Fig. 1 is an end view of one form of rotor; Fig. 2 is a top plan of Fig. 1; Fig. 3 is a view similar to Fig. 2 but showing in section another form of the invention; Fig. 4 is an end view of the form of Fig. 3; and Fig. 5 is a detail.

On the drawing the same numerals identify the same parts throughout.

The numeral 1 indicates a magnetic shaft of steel or the like and 2 the magnets carried by the shaft in radial position. The inner ends of these magnets are received between ribs 3 on the surface of the shaft, these ribs being formed by longitudinal grooves 4 of about the same width as the thickness of the magnets. Each magnet is not of great length between poles which exist at the two radial ends, but is of superior magnetic material having a coercive force and remanence of at least that of 15% cobalt magnet steel. Preferably the magnets are arranged with north and south poles alternating around the circumference of the rotor.

The magnets are arranged between a pair of end discs 5 and 6 which are centrally perforated so that they can be slipped over the shaft and are shaped to fit the ribs 3 and grooves 4 of shaft 1. At one end the ribs 3 have projections or shoulders 7 against which the disc 6 or 6' abuts, and the shaft 1 has near the other end another shoulder 8 which is riveted over against the outer face of the disc 5 or 5'. Thus neither the magnets nor the discs move axially along the shaft, while keyed engagement of the discs and magnets insures the rotation thereof with the shaft. The magnets 2 may have laminated pole pieces 9 at their outer radial ends, each lamination having a recess into which one magnet projects. These laminations are secured between the discs 5 and 6 by the through rivets 10 and therefore neither the magnets 2 nor the pole pieces 9 can move radially outward from the shaft 1. In Fig. 5 the shape of each disc at the central aperture 12 is shown. The edge of this aperture has recesses 13 between tongues 14, the former receiving ribs 3 on the shaft and the latter entering the grooves 4. Thus the plates are keyed to the shaft the same as the magnets 2. A compact rotor is formed in which none of the parts becomes loose at any reasonable speed of rotation.

In Figs. 1 and 2 the discs 5 and 6 are of magnetic material as steel or the like with radial slots 11 between the magnets to prevent magnetic short circuit thereof. In Figs. 3 and 4 the discs 5' and 6' are of non-magnetic material as bronze or the like without such slots. The shaft 1 may be provided with ball bearings or other suitable bearings and may have a tapered drive end customary in magneto armatures.

While I have described the rotor herein as part of an ignition magneto I may of course employ it in other types of dynamo electrical machines. It may have any suitable number of magnets radially arranged around its circumference and may be used with any suitable form of stator to produce a bipolar or multipolar machine. When used in a magneto for ignition, suitable interrupting and distributing mechanism and generating windings will be provided.

Having described the invention, what is claimed is:

1. A magnetic rotor comprising a shaft having longitudinal grooves, bar magnets engaging said grooves at their inner ends, and means on the shaft and rigid with the magnets to retain said magnets in position, said shaft magnetically connecting opposite poles of adjacent magnets.

2. A magnetic rotor comprising a shaft having longitudinal grooves on its outer surface, bar magnets having their inner ends received in said grooves, and discs on said shaft at each end of said magnets, said discs being fastened to said magnets and also having keyed engagement with said grooves, said shaft magnetically connecting opposite poles of adjacent magnets.

3. A magnetic rotor comprising a shaft, bar magnets keyed to the shaft in radial position, discs between which the magnets are located, and pole shoes on the outer ends of the magnets between the discs, said discs and pole shoes and shaft being rigidly secured together, to retain said magnets therebetween, said shaft forming a magnetic connection for all magnets.

4. A magnetic rotor comprising a shaft, bar magnets in longitudinal grooves on the shaft extending radially therefrom, discs between which the magnets are located, and pole shoes on the outer end of the magnets between the discs, said pole shoes and said discs being secured together and said discs having keyed engagement with said shaft, said shaft forming a magnetic connection for all magnets.

5. A magnetic rotor comprising a shaft, bar magnets in radial position with respect to the shaft, the latter having longitudinal grooves therein to receive one end of each magnet, and end discs on the shaft for enabling the magnets to be secured to the shaft, said shaft forming a magnetic connection for all magnets.

6. A rotor according to claim 5, wherein each magnet has a pole shoe at its outer end.

7. A magnetic rotor comprising a shaft, magnets keyed directly to the shaft, and means on the shaft and made rigid with said magnets for enabling the latter to be held in position on said shaft, said shaft magnetically connecting opposite poles of adjacent magnets.

8. A magnetic rotor comprising a shaft having longitudinal grooves therein, a disc on said shaft with a central opening having keyed engagement therewith by means of said grooves, said shaft carrying shouldered portions to engage the outer face of said disc, another disc with central opening having keyed engagement with said grooves and spaced from the first disc, magnets between said discs and also having keyed engagement with said grooves at their inner ends, pole shoes at the outer ends of the magnets between the discs, securing means passing through said pole shoes and said discs, and a shoulder on said shaft adjacent the second named disc and riveted against the same.

9. A magnetic rotor comprising a shaft having longitudinal grooves separated by ribs, said ribs having shouldered projections at one end, a perforated disc on the shaft having portions engaging said grooves and abutting said shoulders, a second disc spaced from the first disc adjacent a shoulder on the shaft, magnets between said discs entering said grooves at their inner ends, pole shoes between the discs at the outer ends of the magnets, and rivets passing through the discs and said pole shoes to hold the pole shoes and magnets in position, said second shoulder being riveted over against said second named disc.

10. A magnetic rotor having a shaft with longitudinal grooves therein, a disc on the shaft with a central opening shaped to have keyed engagement with said grooves, said shaft having shouldered engagement with the outer face of said disc, another disc with a central opening having keyed engagement with said grooves, the shaft having shouldered engagement with the outer face of the latter disc, and magnets secured between said discs.

11. A magneto rotor comprising a shaft, a plurality of flat bar magnets disposed longitudinally of said shaft and extending radially therefrom, said shaft forming a magnetic connection for the inner poles of all magnets.

12. A magnetic rotor comprising a shaft, discs keyed to the shaft and a flat bar magnet secured between the discs and keyed to said shaft, said shaft forming a portion of the magnetic circuit of said magnet and said discs being of magnetic material.

13. A magnetic rotor comprising a shaft, discs keyed to the shaft and a flat bar magnet secured between the discs and keyed to said shaft, said shaft forming a portion of said magnetic circuit of said magnet, said discs being of magnetic material and having radial slots between said magnets.

LOUIS BEEH.